Fig. 4

United States Patent Office 3,136,726
Patented June 9, 1964

3,136,726
FIRE-RESISTANT HYDRAULIC FLUID
AND LUBRICANT
Douglas H. Moreton, Pacific Palisades, Calif., assignor to
Douglas Aircraft Company, Inc., Santa Monica, Calif.
Filed June 28, 1957, Ser. No. 668,700
10 Claims. (Cl. 252—49.9)

This invention relates to a new composition of matter useful particularly as an extremely fire-resistant and explosion-resistant hydraulic fluid and lubricant.

Many fluids are known which have a satisfactory combination of properties required for hydraulic fluids for many uses, but prior to this invention no satisfactory fluid was available which has such a combination of properties as required for a hydraulic fluid and lubricant and which is also adeqautely fire-resistant and explosion-resistant to meet the needs for many important uses.

It is an especially important discovery in accordance with the invention that by the combination of at least two essential ingredients, a new hydraulic fluid and lubricant is made available which not only has such a combination of properties making it useful as a hydraulic fluid and lubricant for many important uses but which also is extremely fire-resistant and extremely explosion-resistant so that the fluids of the invention can be used with safety and reliability in places where the damage and injury resulting from fire or explosion due to the hydraulic fluid would be severe.

The fire-resistant and explosion-resistant fluids of the invention are especially useful for avoiding such serious risks in the hydraulic systems of die casting machines, hydroelectric turbines, hydraulic presses, glass drawing machines and many others known to those familiar with the art. In such hydraulic systems the fluid is usually under high pressure, and, should the fluid escape from the system, as by a leak, a spray of 40 feet or more may result. Also, the fluid might be atomized forming a dangerous explosive liquid-air mixture. Since, in connection with such uses the sources of ignition are many, including, for illustration, welding equipment, gas burners, electric heating units, sparks from electric motors or switches, red hot metal, molten metal, hot field rheostats, heated dies and heat treating furnaces, bad fires and explosions will result with hydraulic fluids not adequately fire-resistant and explosion-resistant.

The extreme fire-resistance and extreme explosion-resistance attained for fluids in accordance with the invention must be clearly distinguished from the loose reference in the art to substances as being relatively "non-flammable." For example, statements can be found in the art to the effect that phosphate esters generally are "non-flammable." It should be carefully noted that the fire-resistance of the different phosphate esters varies widely and that the extreme fire-resistance of the fluids of the invention is much greater and different in kind, as understood by those skilled in the art from results of special tests for fire-resistance, from the so-called "non-flammability" of phosphate esters.

Fluids of this invention are fire-resistant as determined by a number of very severe tests for fire-resistant properties. Thus, fluids of the invention have a high autogenous ignition temperature (ASTM Method D:286–30 modified for high temperatures above about 1100° F. by a quartz flask instead of glass and a 25–20 stainless steel block and lid for holding the flask instead of the molten lead bath), do not flash or ignite when sprayed, dripped or flooded onto the surface of a molten alloy at 1500° F., do not flash or ignite when the mist from spraying through a small orifice under pressure of 1000 p.s.i. is exposed to the hottest portion of the flame of an oxyacetylene welding torch, do not burn when dripped onto a hot manifold at 1300° F. and above (even when the temperature is raised to 1475° F.), do not flash or burn when sprayed through a ⅛" petcock at varying pressures up to 200 p.s.i. through a carbon arc with a free arcing distance of 1½", do not flash or burn when a carbon arc is struck between the electrode and the bottom of a metal pan filled with fluid to ¾" depth so that the arc passes through the fluid, even when the arc is sustained for 30 seconds with the carbon electrode becoming white hot.

The fluids of this invention have not only extremely high fire-resistance and explosion-resistance but also a combination of properties making them very useful as hydraulic fluids and lubricants. Such properties particularly include good lubricating properties, good lubricity over a wide range of loads, good pump life, good physical and chemical stability, good thermal stability, good hydrolytic stability, non-corrosiveness, adequately low viscosity at such low temperatures normally encountered in use, adequately high viscosity at high temperatures normally encountered in use, adequately low pour point so that the composition is liquid at the relatively low temperatures normally encountered in use, compatibility with other materials used in hydraulic systems such as packings, low volatility in the sense that no component selectively evaporates from the composition.

The fluids to be useful as lubricants or hydraulic fluids and lubricants, especially in the many hydraulic systems having pumps, must be good lubricants especially over a wide range of loads. This particularly includes those two ranges of loads known generally as the low load range, or thin-film or anti-wear range, and the high load range, or anti-weld range. For tests on the well-known Shell 4-ball machines this includes the low load range of from 0 to about 60–70 kilograms tested on the Shell 4-ball wear tester and the high load range of from about 70 to 90–100 kilograms tested on the Shell 4-ball extreme pressure tester. These lubricity testing machines are especially effective in testing the "chemical lubricity" needed at loads sufficiently high to break the hydrodynamic film between the frictional surfaces and cause metal to metal contact so that, in the absence of such chemical lubricity, welding or seizure of the contacting metal surfaces would occur. In other words, chemical lubricity may be described as that lubricity which results from chemical reaction between the fluid and metal frictional surfaces converting the contacting surfaces into anti-gall and anti-seize chemical compounds, when, at high loads, the hydrodynamic film between the frictional surfaces is broken and metal to metal contact occurs. Chemical lubricity is to be distinguished from lubricity resulting from viscosity, that is, at loads not high enough to break the hydrodynamic film. Chemical lubricity is also distinguishable from lubricity resulting from polarity effects of the fluid, that is, from a polar attraction between the fluid and the metal surface tending to hold a thin film of the fluid to the metal surfaces. It is an especially surprising result obtained in accordance with the invention that fluids of the invention have good lubricity, particularly as determined by these two different Shell 4-ball machines, over both the low load range and also over the high load range. Thus the two essential components of the invention cooperate in this particular respect so that the inventive fluids are useful as lubricants for many industrial hydraulic systems where extremely long life of pumps is obtained because of this surprising good lubricity over such a wide load range and in combination are also surprisingly fire-resistant.

It is also an important feature of the invention that fluids of the invention made of the two essential ingredients are also surprisingly useful as the lubricant for air compressors wherein they are especially and surprisingly satisfactory for avoiding explosions and avoiding such deposition on the valves of the compressor which with other lubricants causes sticking of the valves while at the same time providing a very satisfactory lubricant for air compressors.

Thus it is an important discovery in accordance with the invention that, when the fluids of the invention are regarded with respect to their intended use, they exhibit a surprising synergism with respect to the over-all combination of properties required for a practical useful fluid as well as a synergism with respect to important individual properties.

It is an especially surprising discovery in accordance with the invention that this hitherto unattained combination of requirements referred to above can be satisfied by a fluid made from at least only two essential ingredients. These are:

(1) A suitable chlorinated biphenyl having a critical weight percent of combined chlorine, and
(2) A suitable triaryl phosphate or mono-alkyl diaryl phosphate ester.

The phosphates especially suitable for my invention are the triaryl phosphates in which the aryl radicals have from 6 to 8 carbon atoms, that is, may be phenyl, cresyl or xylyl, and in which the total number of carbon atoms in all three of the aryl radicals is from 19 to 24, that is, in which the three radicals include at least one cresyl or xylyl radical. Examples of such phosphates include tricresyl, trixylyl, phenyl dicresyl, and cresyl diphenyl phosphates. The triaryl phosphates are preferred for the best combination of properties particularly including high fire-resistance properties, but especially for relatively low viscosity at low temperatures, mono-alkyl diaryl phosphates may be used in which the aryl radicals may have from 6 to 8 carbon atoms and may be phenyl, cresyl or xylyl and the alkyl radical may have from about 4 to 12 carbon atoms. Examples of the alkyl di-aryl phosphates include butyl diphenyl, amyl diphenyl, hexyl diphenyl, heptyl diphenyl, octyl diphenyl, 6-methyl heptyl diphenyl and 2-ethyl hexyl diphenyl phosphates. Although the examples below illustrate the invention with tricresyl phosphate, other triaryl phosphates and alkyl diaryl phosphates, as disclosed above, could be used, or substituted for the tricresyl phosphate, without substantially affecting the excellent results obtained.

The chlorinated biphenyls suitable for the purpose of my invention are those having from about 40 to 55% combined chlorine such as the tri-, tetra-, and penta-chlorobiphenyls.

Suitable chlorinated biphenyls are available in the trade; for example, they are made and sold by the Monsanto Chemical Company under its trademark designation "Aroclor." In terms of the trademark designation of the Monsanto Chemical Company, Aroclor 1242, Aroclor 1248, and Aroclor 1254 are preferred for the compositions of this invention. These Aroclor chlorinated biphenyls contain about 42%, 48% and 54% by weight of combined chlorine, respectively, and also correspond approximately to the tri-, tetra-, and penta-chlorobiphenyls, respectively. The Aroclor chlorinated biphenyls are further described in the trade publication of the Monsanto Chemical Company entitled "The Aroclors, Physical Properties and Suggested Applications," and in particular, the physical properties of the Aroclor products which are set out on pages 4 and 5 of that publication.

The properties of Aroclors 1242, 1248 and 1245 are given in the following table:

| | Aroclor 1242 | Aroclor 1248 | Aroclor 1254 |
| --- | --- | --- | --- |
| Form | Practically colorless mobile oil. | Yellow tinted mobile oil. | Light yellow viscous oil. |
| Color—Apha | 100 max | 100 max | 150 max. |
| Acidity, maximum (mgm. KOH per gm.) | 0.015 | 0.015 | 0.015. |
| Average coefficient of expansion, cc./cc./° C. | 0.00068 (25°–65° C.) | 0.00070 (25°–65° C.) | 0.00066 (25°–65° C.). |
| Density, specific gravity, 25°/25° C. (77°/77° F.) | 1.378–1.388 | 1.447–1.457 | 1.538–1.548. |
| Distillation range, ASTM D-20 (mod.), Corr. ° C. | 325–360 | 340–375 | 365–390. |
| Evaporation loss percent, ASTM D-6 mod.: | | | |
| 163° C. __ 5 hrs | 3.0 to 3.6 | 3.0 to 4.0 | 1.1 to 1.3. |
| 100° C. __ 6 hrs | 0.0 to 0.4 | 0.0 to 0.3 | 0.0 to 0.2. |
| Flash point, Cleveland Open Cup: | | | |
| ° C. | 176–180 | 193–196 | None. |
| ° F. | 348–356 | 379–384 | |
| Fire point, Cleveland Open Cup: | | | |
| ° C. | None* | None | Do. |
| ° F. | | | |
| Pour point ASTM D-97: | | | |
| ° C. | −19 | −7 | 10. |
| ° F. | 2 | 19.4 | 50. |
| Refractive index, D-line—20° C. | 1.627–1.629 | 1.630–1.631 | 1.639–1.641. |
| Viscosity-Saybolt Universal Sec. (ASTM-D-88): | | | |
| 210° F. (98.9° C.) | 34–35 | 36–37 | 44–48. |
| 130° F. (54.4° C.) | 49–56 | 69–78 | 260–340. |
| 100° F. (37.8° C.) | 80–93 | 185–240 | 1800–2500. |

*None indicates "No fire point up to boiling temperature."

The invention will be further described below in connection with the drawings in which:

FIGURE 3 is a chart showing that, for compositions made with tricresyl phosphate and chlorinated biphenyl having combined chlorine below but near the critical value, the lubricity of the composition is better than for the lubricity of the tricresyl phosphate component and better than for the chlorinated biphenyl component but not over the entire load range, clearly showing the borderline of the critical value for combined chlorine content on the chlorinated biphenyl for the synergistic result depicted for the invention in FIGURE 1.

The following is an example of a composition made with the two essential ingredients of the invention.

Example 1:
  50 weight percent tricresyl phosphate
  50 weight percent Aroclor 1248

The tricresyl phosphate was a mixture of the meta and para isomers and free of the ortho isomer. Aroclor 1248 was chlorinated biphenyl having 48 percent by weight of combined chlorine. The chlorine content is 24 weight percent of the composition and was chemically combined with the chlorinated biphenyl component as 48%-chlorinated biphenyl.

The resulting liquid composition has the high autogenous ignition temperature (ASTM Method D:286–30 modified for very high temperatures) of about 1200° F. When sprayed, dripped or flooded onto the surfaces of molten alloy at about 1500° F. it does not flash or ignite. When the mist from spraying through a small orifice under 1,000 p.s.i. is subjected to the flash of an oxyacetylene welding torch it does not flash or ignite, and this mist does not flash or ignite even when exposed to the hottest portion of the oxyacetylene flame (about 6,000° F.). When dripped onto the surface of a hot manifold, it does not burn at 1475° F. When sprayed through a ⅛" petcock at varying pressures up to 200 p.s.i. through a carbon arc with a free arcing distance of about 1½" it does not flash or burn. When a metal pan is filled to a depth of about ¾" and an arc struck between the electrode and the bottom of the pan so that the arc passes through the fluid, it does not flash or burn and does not flash or burn even when the arc is sustained for about 30 seconds with the carbon electrode becoming white hot.

When tested for high-temperature high-pressure spray flammability fire-resistance property in accordance with United States Government Specification MIL–F–7100, it does not ignite when the test is modified with either the Pyrox torch with #3 tip or the more severe Victor Type J–50 torch with #2 tip.

This composition also has the following properties:

Viscosity at—
  210° F. _____________________centistokes__ 3.85
  100° F. _____________________do____ 41.9
Cloud point _____________________________ None
Pour point _____________________________ ° F__ +7

This composition has good lubricity over the wide range of loads from about 1 to 100 kilograms as shown by tests on the Shell 4-ball machine for the load range of from 1 to 40 kilograms and the Shell 4-ball extreme pressure machine over the load range of from about 70 to 100 kilograms. These results are shown in the following tables.

Tests on the Shell 4-ball machine over the low load range of 1 to 40 kilograms made at 75° C. for a period of one hour at 600 revolutions per minute are shown in the following table along with comparable results on the individual components.

TABLE I

*Results of Lubricity Tests on Shell 4-Ball Machine*

[Steel-on-steel, 600 r.p.m., 75° C., 1 hour]

| Composition | Scar diameter in millimeters Applied load | | |
|---|---|---|---|
| | 1 kg. | 10 kgs. | 40 kgs. |
| Tricresyl phosphate | .13 | .24 | .58 |
| 48%-chlorinated biphenyl | .15 | .34 | .67 |
| Composition of Example 1: 50 wt. percent tricresyl phosphate; 50 wt. percent 48%-chlorinated biphenyl | .11 | .22 | .63 |

From Table I above, it is evident that, over the low load range of from 1 to 40 kilograms, the composition has better lubricity than the chlorinated biphenyl component. For the load values of 1 kilogram and 10 kilograms, the results obtained for the composition are somewhat better than for the tricresyl phosphate alone, which is by far the better of the two components, and, hence, for these two load values, the results for the composition are better than for either component, showing a synergistic action of the components.

Tests on the Shell 4-ball extreme pressure machine over the high load range of about 70 to 100 kilograms made at the room temperature of about 75° F. for a period of time of 10 seconds at 1800 revolutions per minute are shown in the following table along with comparable results on the individual components.

TABLE II

*Results of Lubricity Tests on Shell 4-Ball Extreme Pressure Machine*

[Steel-on-steel, 1800 r.p.m., 10 seconds, room temp.]

| Composition | Scar diameter in millimeters Applied load | | | |
|---|---|---|---|---|
| | 71 kgs. | 79 kgs. | 89 kgs. | 100 kgs. |
| Tricresyl phosphate | 2.0 | 2.2 | 2.3 | 2.5 |
| 48%-chlorinated biphenyl | 0.54 | 0.54 | 0.55 | 0.57 |
| Composition of Example 1: 50 wt. percent tricresyl phosphate; 50 wt. percent 48%-chlorinated biphenyl | 0.38 | 0.40 | 0.41 | 0.43 |

From Table II above it is evident that over the extremely high load range of from about 70 to 100 kilograms the composition has not only generally satisfactory values for lubricity but in addition the values obtained for the composition are clearly better than for either component.

The following Tables III and IV further illustrate compositions of the invention:

TABLE III

*Fluids*

| Fluid | Tricresyl phosphate, wt. percent | Chlorinated biphenyl | | Chlorine in fluid, wt. percent | Viscosity in centistrokes at— | | Viscosity index | Pour point, ° F. | Cloud point |
|---|---|---|---|---|---|---|---|---|---|
| | | Wt. percent in fluid | Combined chlorine, wt. percent | | 210° F. | 100° F. | | | |
| A | 17 | 83 | 48 | 40 | 3.41 | 42.4 | −479 | +17 | None. |
| B | 45 | 55 | 48 | 26.4 | 3.78 | 42.0 | −403 | +8 | Do. |
| C | 60 | 40 | 48 | 19.2 | 4.00 | 41.7 | −237 | +5 | Do. |
| D | 70 | 30 | 48 | 14.4 | 4.14 | 40.6 | −176 | 0 | Do. |
| E | 77 | 23 | 48 | 11 | 4.24 | 39.5 | −132 | −2 | Do. |
| F | 77 | 23 | 42 | 9.7 | 4.00 | 33.8 | −111 | −7 | Do. |

Table III above shows that very satisfactory fluids are obtained in accordance with invention with respect to usefulness at normal temperatures of use.

TABLE IV

*Fire Resistant Properties Fluids of Table III*

| Fluid | Autogenous ignition temperature, °F. (ASTM D:286-30 modified) | Hot manifold ignition temperature, MIL-F-7100 | High temperature high pressure spray flammability, MIL-F-7100 modified with— | |
|---|---|---|---|---|
| | | | Pyrox torch #3 tip | Victor J-50 torch #2 tip |
| A | 1,240 | No ignition to 1430° F.[1]. | Did not ignite. | Did not ignite. |
| B | 1,210 | do.[1] | do | Do. |
| C | 1,180 | do.[1] | do | Do. |
| D | 1,155 | do.[1] | do | Do. |
| E | 1,140 | do.[1] | do | Ignited.[2] |
| F | 1,130 | do.[1] | do | Ignited.[3] |

[1] Limit of test equipment.
[2] Ignited only when oxyacetylene torch was applied to fluid stream, flame carried about 6 feet of 8 foot stream, and was self-extinguishing when torch was removed.
[3] Ignited only when oxyacetylene torch was applied to the fluid stream with flame carrying full 8' length, but was self-extinguishing when the torch was removed.

Table IV above shows that fluids of the invention have extremely high fire-resistance properties. The autogenous ignition temperatures are all in an extremely high range, the very high temperature of 1430° F. on the hot manifold without ignition is an extremely high fire resistance property, no ignition in the high temperature high pressure spray flammability test with the severity of the Pyrox torch with #3 tip also shows an extreme degree of fire-resistance. The high temperature high pressure spray flammability test with the Victor J-50 torch with the #2 tip is an exceedingly rigorous test and the fact that fluids will not ignite under such conditions shows a very extremely high degree of fire-resistance, the ignition obtained for fluids E and F indicates that in general the chlorine content in the composition is preferably above about 12%. Fluids E and F are nevertheless useful fire-resistant fluids in accordance with the invention but do not have the extremely high fire-resistance as determined by the high temperature high pressure spray flammability test with the extremely severe conditions resulting from the use of the Victor J-50 torch with the #2 tip.

In Table V the results given for fluids A, B, E and F, show that these fluids of the invention have very satisfactory lubricity values within the high load range, much better than for the tricresyl phosphate component alone.

TABLE V

*Results of Lubricity Tests on Shell 4-Ball Extreme Pressure Machine*

[Steel-on-steel, 1800 r.p.m., 10 seconds, room temp.]

| Fluid | Composition | | | | Scar diameter in millimeters | | | |
|---|---|---|---|---|---|---|---|---|
| | Tricresyl phosphate, wt. percent | Chlorinated biphenyl | | Chlorine in fluid, wt. percent | Applied load | | | |
| | | Wt. percent in fluid | Combined chlorine, wt. percent | | 71 kgs. | 79 kgs. | 89 kgs. | 100 kgs. |
| A | 17 | 83 | 48 | 40 | 0.370 | 0.393 | 0.414 | 0.442 |
| B | 45 | 55 | 48 | 26.4 | 0.382 | 0.403 | 0.414 | 0.432 |
| E | 77 | 23 | 48 | 11 | 0.389 | 0.410 | 0.451 | 2.53 |
| F | 77 | 23 | 42 | 9.7 | 0.341 | 0.368 | 2.16 | 2.45 |

For Fluid E, such values are obtained for 71, 79, and 89 kilogram loads, but because the proportion of the chlorinated biphenyl is below the preferred proportion of about 40 volume percent, the surprising low value is not obtained at 100 kilograms. For Fluid F, where the chlorinated biphenyl has only 42% combined chlorine instead of 48% and the proportion is below the preferred proportion, the very low values are obtained for the load values of 71 and 79 kilograms. Although Fluids E and F are compositions of the invention, this aspect of the discovery indicated that a higher chlorine content is preferred to lower the scar diameters at the very high load values.

The following table further shows compositions in accordance with the invention and that the lubricity of the compositions, as measured on the Shell 4-ball machine over the high load range, of from 70 to 100 kilograms, is better than for either component when the chlorinated biphenyl is above the critical value of at least about 40% by weight of combined chlorine.

TABLE VI

*Results of Lubricity Tests on Shell 4-Ball Extreme Pressure Machine*

[Steel on-steel, 1800 r.p.m., 10 seconds, room temp.]

| Fluid | Composition | Scar diameter in millimeters | | | |
|---|---|---|---|---|---|
| | | Applied load | | | |
| | | 71 kgs. | 79 kgs. | 89 kgs. | 100 kgs. |
| No. 1 | Tricresyl phosphate | 2.00 | 2.15 | 2.33 | 2.51 |
| No. 2 | 42%-chlorinated biphenyl | 0.50 | 0.53 | 0.53 | 0.56 |
| No. 3 | 50 vol. percent 42%-chlorinated biphenyl; 50 vol. percent tricresyl phosphate. | 0.37 | 0.40 | 0.41 | 0.44 |
| No. 4 | 48%-chlorinated biphenyl | 0.54 | 0.53 | 0.55 | 0.57 |
| No. 5 | 50 vol. percent 48%-chlorinated biphenyl; 50 vol. percent tricresyl phosphate. | 0.38 | 0.40 | 0.41 | 0.43 |

This table shows that for both Fluid No. 3 and Fluid No. 5, which are compositions in accordance with the invention, in which the chlorinated biphenyl component has a combined chlorine content above the critical value of at least about 40%, the lubricity in the high load range is better for the two component composition than for either component alone throughout the entire high load range from 70 to 100 kilograms.

Figure 1:
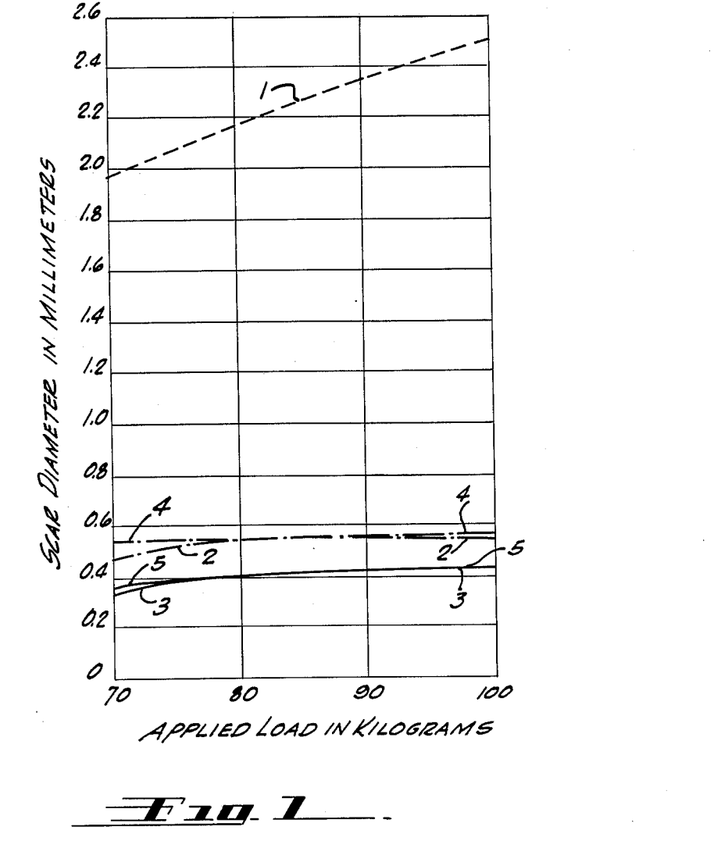
FIGURE 1 is a chart showing that, for compositions made with tricresyl phosphate and chlorinated biphenyl having combined chlorine above the critical value, the lubricity of the compositions is better than for the lubricity of either components over the entire high load range, that is a synergistic result from the combination.

These phenomenal results are depicted in FIGURE 1, where curve 1 shows the values obtained for tricresyl phosphate alone, curve 2 the values obtained for 42%-chlorinated biphenyl alone, curve 4 the values obtained for 48%-chlorinated biphenyl alone, and, for compositions made of these components, curve 3 shows the values obtained for the composition made of equal volumes of tricresyl phosphate and 42% chlorinated biphenyl, and curve 5 shows the values obtained for a composiiton made of equal volumes of tricresyl phosphate and 48%-chlorinated biphenyl. Curve 3 and curve 5 each shows a lower scar diameter and better lubricity than for either component over the entire high load range from 70 to 100 kilograms. Such results are obtained when the percentage combined chlorine on the chlorinated biphenyl is above the critical value of 40%.

Furthermore, the weld point as tested on the Shell 4-ball extreme pressure machine was 105 kilograms for the tricresyl phosphate and the increased value of 112 kilograms for the two component composition, Fluid No. 5 of Table VI, consisting of equal volumes of tricresyl phosphate and 48%-chlorinated biphenyl. Such an increase in weld point above the very high value of 105 kilograms for the tricresyl phosphate, which itself is extremely high, is a very unexpected result for compositions of the invention.

Is is an especially important and outstanding discovery in accordance with the invention that the combined chlorine content of the chlorinated biphenyl is critical with respect to the surprising and unexpected results obtained in accordance with the invention. This is true not only for the surprising results obtained with respect to lubricity, particularly as illustrated in Table VI and FIGURE 1 of the drawing, but also in connection with other results as will be more particularly pointed out below. The criticality of the combined chlorine content on the chlorinated biphenyl with respect to lubricity will be demonstrated by reference to Table VII and Table VIII and FIGURES 2 and 3 of the drawing as described below.

The following table shows results for lubricity obtained for a composition made with tricresyl phosphate and chlorinated biphenyl having only 21% by weight of combined chlorine, which is below the critical value of combined chlorine content of at least about 40%, compared with results obtained on these components alone.

TABLE VII

*Results of Lubricity Tests on Shell 4-Ball Extreme Pressure Machine*

[Steel-on-steel]

| Fluid | Composition | Scar diameter in millimeters | | | |
|---|---|---|---|---|---|
| | | Applied load | | | |
| | | 71 kgs. | 79 kgs. | 89 kgs. | 100 kgs. |
| No. 1 | Tricresyl phosphate | 2.00 | 2.15 | 2.33 | 2.51 |
| No. 6 | 21%-chlorinated biphenyl | 0.66 | 0.69 | 0.77 | 1.83 |
| No. 7 | 50 vol. percent 21%-chlorinated biphenyl; 50 vol. percent tricresyl phosphate. | 0.57 | 1.43 | 1.98 | 2.20 |

Table VII shows that for loads greater than about 70 kilograms the surprising result of the composition being better than each component is not obtained. This results from the combined chlorine content on the chlorinated biphenyl component being less than about 40%, namely, only 21%.

Figure 2:
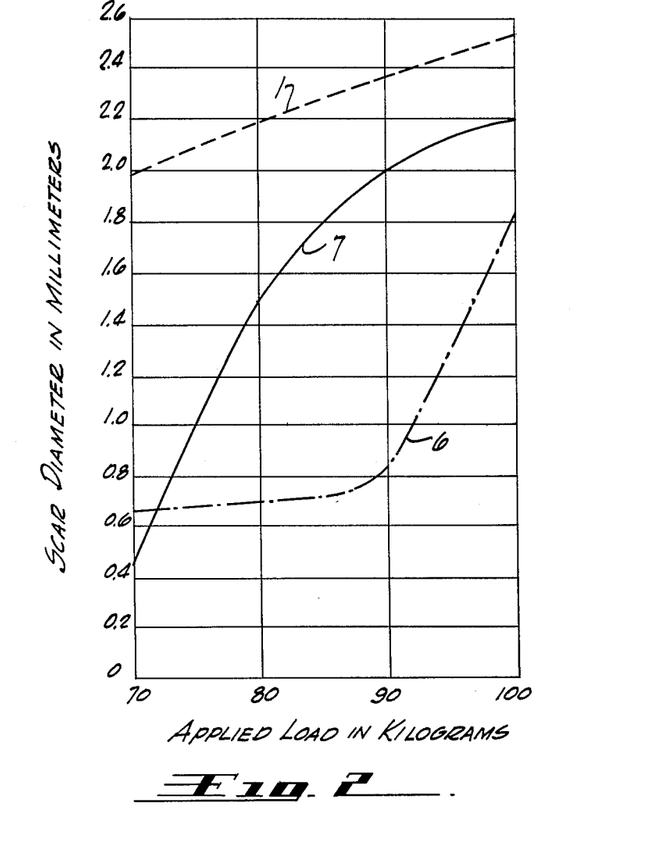
FIGURE 2 is a chart showing that, for the compositions made with tricresyl phosphate and chlorinated biphenyl having combined chlorine below the critical value, the lubricity of the composition, although better than for the tricresyl phosphate component, is not as good as for the chlorinated biphenyl component, over the high load range, and showing that the surprising synergistic result shown in FIGURE 1 is not obtained.

This is also shown in FIGURE 2 where curve 7 for the composition of equal volumes of tricresyl phosphate lies in between curve 1 for the tricresyl phosphate and curve 6 for the 21%-chlorinated biphenyl for loads greater than 70 kilograms.

The following table shows results for lubricity obtained for a composition made with tricresyl phosphate and chlorinated biphenyl having only 32% by weight of combined chlorine, which is below the critical value of combined chlorine content of at least about 40%, compared with results obtained on these components alone.

TABLE VIII

*Results of Lubricity Tests on Shell 4-Ball Extreme Pressure Machine*

[Steel-on-steel]

| Fluid | Composition | Scar diameter in millimeters | | | |
|---|---|---|---|---|---|
| | | Applied load | | | |
| | | 71 kgs. | 79 kgs. | 89 kgs. | 100 kgs. |
| No. 1 | Tricresyl phosphate | 2.00 | 2.15 | 2.33 | 2.51 |
| No. 8 | 32%-chlorinated biphenyl | 0.57 | 0.62 | 0.64 | 0.65 |
| No. 9 | 50 vol. percent 32%-chlorinated biphenyl; 50 vol. percent tricresyl phosphate. | 0.42 | 0.41 | 0.48 | 2.35 |

Table VIII shows that for loads of about 90 and below in the range of 70 to 100 kilograms, the surprising result of the composition being better than each of the two components alone is obtained, but for loads greater than about 90, this result is not obtained. This further shows that the combined chlorine content is critical and that the value of 32% by weight of combined chlorine is near the critical value of about 40%.

This result is also depicted in FIGURE 3 where curve 9 shows the results for the composition having equal volumes of tricresyl phosphate and 32%-chlorinated biphenyl, curve 1 the results for tricresyl phosphate alone and curve 8 for the 32%-chlorinated biphenyl alone.

Although it has been found that the lubricity results obtained from tests on the Shell 4-ball extreme pressure machine improve, in general, for compositions of the invention, with increase in chlorine content of the composition, the discovery that the weight percent combined chlorine on the chlorinated biphenyl is critical for obtaining the best results is a very important aspect of the invention. The latter is further shown in FIGURE 4, which depicts lubricity from tests on the Shell 4-ball extreme pressure machine for three compositions each having about the same chlorine content in the composition but where the combined chlorine on the chlorinated biphenyl component is 21, 42 and 48 percent combined chlorine. Thus cruve 7 shows results for a composition made of 50 weight percent of tricresyl phosphate and 50 weight percent of 21%-chlorinated biphenyl, containing 10.5% chlorine in the composition, curve 10 for a composition made of 77% tricresyl phosphate and 23% of 42%-chlorinated biphenyl, containing 9.7% chlorine in the composition, and curve 11 for a composition made of 77% tricresyl phosphate and 23% 48%-chlorinated biphenyl, containing 11% chlorine in the composition.

Figure 4:
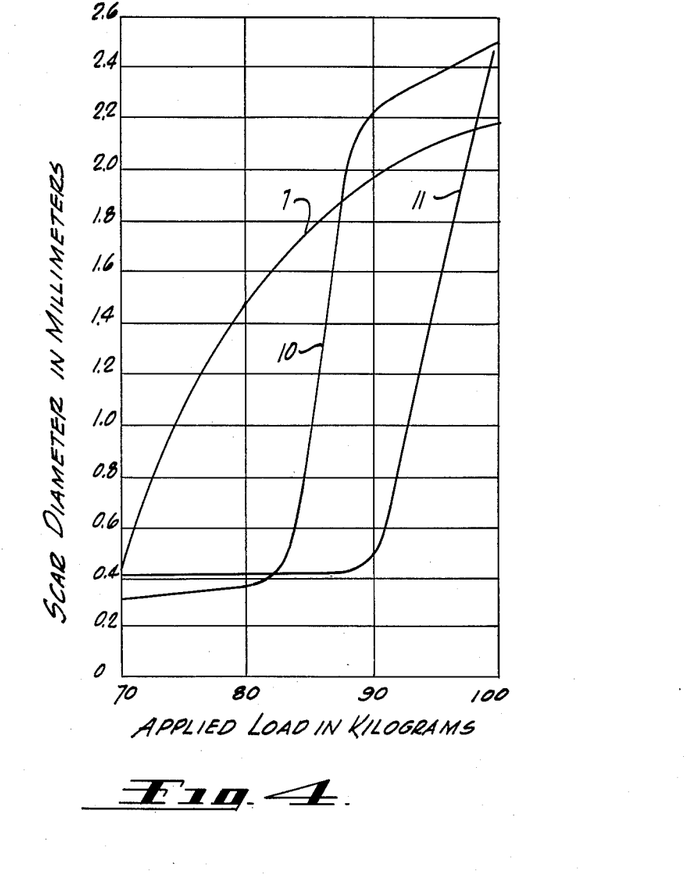
FIGURE 4 is a chart showing the criticality of combined chlorine content on the chlorinated biphenyl component as illustrated with compositions having substantially the same chlorine content in the composition derived from chlorinated biphenyl components with different combined chlorine contents.
Figure 5:
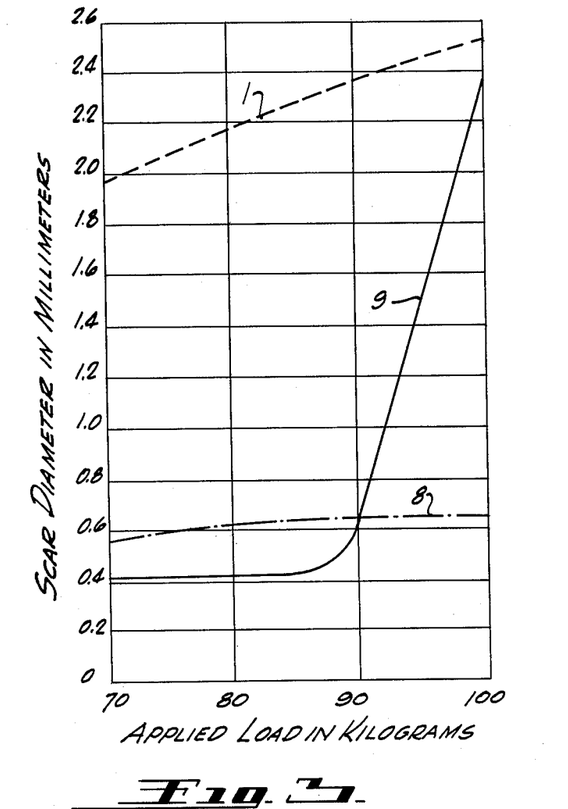

Comparison of curve 7, curve 10, and curve 11 shows that, with substantially the same chlorine content in the composition (10.5, 9.7 and 11%), the particular chlorinated biphenyl used is critical with respect to the weight percent of combined chlorine on the chlorinated biphenyl. Thus curve 10 shows better results are obtained when using 42%-chlorinated biphenyl with 9.7 weight percent of combined chlorine in the composition as compared with curve 7 for a composition with 10.5 weight percent of chlorine in the composition derived from 21%-chlorinated biphenyl. Still much better results are obtained, as shown by curve 11, for 11 weight percent of chlorine in the composition derived from 48%-chlorinated biphenyl.

The corrosion and oxidation stability of the inventive compositions is illustrated by subjecting a composition consisting of 50 wt. percent of tricresyl phosphate and 50 wt. percent of 48%-chlorinated biphenyl to the corrosion and oxidation stability test in accordance with MIL–F–7100 Specification with the following results:

VISCOSITY AT 130° F.

Centistokes
Initial _______________________________________ 16.6
Final ________________________________________ 16.8
Change _____________________________ Negligible

NEUTRALIZATION NUMBER

| | Mg. KOH/gm. |
|---|---|
| Initial | 0.00 |
| Final | 0.00 |
| Change | None |

EFFECT ON METALS

| | Cu | Fe | Al | Mg | Cd/Fe |
|---|---|---|---|---|---|
| Wt. change mg./cm.$^2$ | −0.19 | 0 | 0 | 0 | −0.016. |
| Visual examination | Dull brown coat. No visible attack. | No change | | | Slight white stain. |
| Fluid evaporation | 3% | | | | |
| Fluid separation | None | | | | |

The foregoing results indicate that the fluid is non-corrosive and highly stable.

To further illustrate the surprising and unexpected results obtained for the essential two components of the invention the seizure load as tested on the Falex lubricant testing machine was found to be 2275 pounds for the tricresyl phosphate, 4500 pounds for the 48%-chlorinated biphenyl and 4500 pounds for the mixture of 50 volume percent of each. It is surprising and unexpected that the high value of 4500 was obtained for the mixture which was not impaired by the relatively low value for the tricresyl phosphate even though present in the large proportion of 50 volume percent.

Another surprising result is shown by the weight loss for a run on the Falex machine for one hour at a load of 1000 pounds. The tricresyl phosphate alone showed a weight loss of 361 milligrams, the 48%-chlorinated biphenyl 15 milligrams and the mixture of 50 volume percent of each only 19 milligrams. It is surprising that the mixture has such a low value, substantially the same as for the chlorinated biphenyl alone and that the tricresyl phosphate, although present in the large proportion of 50 volume percent, did not materially increase the weight loss in the direction of the relatively large value for this phosphate component alone.

Another example of a composition in accordance with the invention especially useful as an air compressor lubricant is:

43 weight percent tricresyl phosphate
57 weight percent 54%-chlorinated biphenyl (having 54 weight percent combined chlorine)

This fluid has the following properties:

Viscosity, Saybolt Universal seconds, at—

| | |
|---|---|
| 50° F. | 15,000 |
| 75° F. | 1,650 |
| 100° F. | 410 |
| 130° F. | 127 |
| 210° F. | 43 |
| Pour point ° F. | 20 |
| Neutralization No. | 0.05 |
| Specific gravity | 1.35 |
| Autogenous ignition temp. ° F. | 1,180 |

It passes all the fire-resistance tests set out for Example 1 above and has substantially the same lubricity properties as tested on the Shell 4-ball machines.

This fluid is an example of such fluids of the invention especially useful for minimizing or avoiding air compressor explosions and receiver fires and deposit formation on exhaust valves and compressed air system components.

In order to obtain fire-resistant hydraulic fluids having outstanding advantages in accordance with the invention, the proportions of the triaryl phosphate and chlorinated biphenyl should usually be within the range of from 20 to 80 volume percent (17 to 77 weight percent) of the triarylphosphate and from 80 to 20 volume percent (83 to 23 weight percent) of the chlorinated biphenyl. For the best overall combination of desirable properties for a fire-resistant hydraulic fluid and lubricant, it is preferred that the proportions be within the range of from 40 to 60 volume percent (34 to 51 weight percent) of the triaryl phosphate and from 60 to 40 (69 to 46 weight percent) volume percent of the chlorinated biphenyl. Particularly for satisfactory lubricating properties, the proportion of the triaryl phosphate should be sufficient to improve the lubricity in the low range of loads, that is, the thin-film boundary region, and the proportion of the chlorinated biphenyl should be sufficient to improve the lubricity in the high range of extreme pressure loads, that is, in the anti-weld range of loads, as described above.

Although the mixtures of such triaryl phosphate ester and chlorinated biphenyl with critical chlorine content have been discovered, in accordance with my invention, to have outstanding properties as indicated above, I have made the further discovery in accordance with my invention that it is possible to decrease the relatively high rate of change of viscosity with temperature of the mixture of tri-aryl phosphate and chlorinated biphenyl and to increase the viscosity at elevated temperature by the addition of an agent to such mixture, which agent varies in its true solubility in the mixture with temperature, so as to decrease the rate of change of viscosity with change in temperature and increase the viscosity at elevated temperatures. Accordingly, I have discovered a new fluid, that is, such a mixture of the essential two components having a lower rate of change of viscosity with temperature than the mixture, or in other words, such a mixture of tri-aryl phosphate and chlorinated biphenyl containing an agent compatible therewith, which so lowers the rate of change of viscosity with temperature and increases the viscosity at elevated temperatures. This is particularly the case as indicated by the viscosity index, which is a particular measure of the rate of change of viscosity with temperature. In general the viscosity index of fluids in accordance with my invention consisting essentially of a two component tri-aryl phosphate and chlorinated biphenyl is undesirably low, and, in accordance with this further discovery, it is possible to provide fluids in accordance with the invention consisting essentially of the two components having a higher viscosity index than the two component mixture and an increased viscosity at such elevated temperatures as 210° F. for example. It is an especially surprising feature of my invention that not only are the two chemically distinct and different materials, phosphate ester and chlorinated biphenyl, compatible with one another and give a mixture having a surprising combination of properties desirable for a fire-resistant hydraulic fluid and lubricant, but also the viscosity at such elevated temperatures as 210° F. of the mixture of these chemically distinct materials can be increased and the rate of change of viscosity with temperature can be decreased, without impairing the surprising combination of properties of the mixture desirable for a fire resistant hydraulic fluid and lubricant.

It is a particular discovery in accordance with my invention that the viscosity index of such a mixture of phosphate ester and chlorinated biphenyl can be improved with respect to viscosity index and viscosity at elevated temperature to a surprising degree by the addition of a suitable poly alkyl methacrylate. Suitable poly alkyl methacrylates for the purposes of this invention are made and sold by and are available from the Rohm and Haas Company, Philadelphia, Pennsylvania, under its trademark "Acryloid" and particularly designated, for example, as Acryloid HF-845, Acryloid HF-855, Acryloid HF-860. In these designations the last two numerals, that is, "45," and "55," and "60," denote the viscosity in centistokes of the poly alkyl methacrylate contained in the commercial product measured in a 30 weight percent solution in toluene at 100° F., or other standard base stock having the viscosity of toluene at 100° F.

In general, these polymers have a molecular weight within the range of about 2,000 to 14,000. Usually, the alkyl radicals of the suitable polymerized alkyl methacrylates will be $C_8$ to $C_{10}$, or from $C_6$ to $C_{12}$. In general, however, the polymerized alkyl methacrylates suitable for my invention will be those having from two to eighteen carbon atoms in the alkyl group and having a molecular weight range within the range of about 2,000 to 20,000 and an average molecular weight within the range of about 3,000 to 15,000; however, it is preferred that the alkyl group be from $C_6$ to $C_{18}$.

In compounding the compositions of this invention, the alkyl methacrylate polymer may be added to the mixture of phosphate and chlorinated biphenyl, or the monomer may be polymerized in situ in the mixture by adding the unpolymerized alkyl methacrylate ester monomer thereto and then polymerizing to the desired degree. Usually a minor proportion and particularly from 0.2 to 10 percent by volume of the poly alkyl methacrylate (exclusive of any solvent) will be found satisfactory, and preferably a proportion within the range from 1 to 5 percent. This percentage of poly alkyl methacrylate is based on the sum of the phosphate and polymer as being 100 percent.

This further discovery in accordance with my invention will be illustrated by the following examples:

In this example a poly octyl methacrylate is added to the composition of Example 1 above to produce the following composition:

48 weight percent tricresyl phosphate
48 weight percent Aroclor 1248
4 weight percent Acryloid F–855

The tricresyl phosphate was a mixture of the meta and para isomers and free of the ortho isomer. Aroclor 1248 was chlorinated biphenyl having 48 percent by weight of combined chlorine. Acryloid HF–855 was a poly octyl methacrylate having an average molecular weight of 10,000 and a range of from about 2,000 to 14,000 dissolved in 45 percent by volume of a light petroleum oil of 200° F. flash point, obtained from Rohm and Haas Company under its trademark designation. Since only a small proportion (4 percent) of the commercial Acryloid HF–855 was added, the proportion of the light petroleum oil was not great enough to impart any undesirable properties to the final liquid product. The polymer without the light petroleum oil solvent may of course be used.

This composition had a pour point of +20° F., no cloud point and a neutralization number of 0.12 mg. KOH/gm. and in Table IX below is shown the surprising and unexpected results obtained with regard to improvement of viscosity index by the addition of the poly alkyl methacrylate in accordance with the invention.

TABLE IX

| Fluid | Viscosity in cs. at— | | Viscosity index |
|---|---|---|---|
| | 210° F. | 100° F. | |
| (1) 48 wt. percent tricresyl phosphate; 48 wt. percent Aroclor 1248; 4 wt. percent Acryloid HF-855 | 6.55 | 55.5 | +65 |
| (2) Tricresyl phosphate | 4.19 | 31.7 | −35 |
| (3) Aroclor 1248 | 3.13 | 40.8 | −590 |
| (4) 50 wt. percent tricresyl phosphate; 50 wt. percent Aroclor 1248 | 3.77 | 37.2 | −232 |
| (5) 96 wt. percent Aroclor 1248; 4 wt. percent Acryloid HF-855 | 6.25 | 69.0 | −7 |

In this composition, it is unexpected and surprising that the poly alkyl methacrylate raises the viscosity index to the high value of +65 from the exceedingly low value of −232 for the mixture of phosphate and chlorinated biphenyl without the Acryloid HF–855. This is especially surprising since this poly alkyl methacrylate is insoluble in the phosphate along and, in the chlorinated biphenyl, in the same proportion changes the viscosity index from −590 to only −7. Moreover, the viscosity index of the tricresyl phosphate alone is −35. Thus, it will be seen that these three components of tricresyl phosphate, chlorinated biphenyl and poly alkyl methacrylate cooperated in a surprising and synergistic way to produce a new and unexpected result.

This liquid composition was also found to have excellent properties making it useful as a non-flammable hydraulic fluid and lubricant. No indication whatever of burning was found by testing in accordance with S.A.E.-A.M.S. 3150 specification for fire-resistance and flammability. Other practical fire tests have been performed with this composition, such as the insertion of a bar of steel, heated to cherry red temperature, into a container of the composition, and a test wherein the composition was slowly poured into a ladle of molten die casting metal. No fire was observed in either of the above extremely severe demonstrations. Moreover, this composition passes the same tests for fire-resistance and lubricity a given above for Example 1, showing that the poly alkyl methacrylate does not impair the composition in these respects, while at the same time, improves the viscosity index to a very high degree. Thus, as for the composition of Example 1 above, this composition containing the poly alkyl methacrylate has the high autogenous ignition temperature (ASTM Method D:286–30 modified for very high temperatures) of about 1200° F. When sprayed, dripped or flooded onto the surface of molten alloy at about 1500° F. it does not flash or ignite. When the mist from spraying through a small orifice under 1,000 p.s.i. is subjected to the flash of an oxyacetylene welding torch it does not flash or ignite, and this mist does not flash or ignite even when exposed to the hottest portion of the oxyacetylene flame (about 6,000° F.). When dripped onto the surface of hot manifold, it does not burn at 1475° F. When sprayed through a carbon arc with a free arcing distance of about 1½" it does not flash or burn. When a metal pan is filled to a depth of about ¾" and an arch struck between the electrode and the bottom of the pan so that the arc passes through the fluid, it does not flash or burn and does not flash or burn even when th arc is sustained for about 30 seconds with the carbon electrode becoming white hot. When tested for high-temperature high-pressure spray flammability fire-resistance property in accordance with United States Government Specification MIL-F-7100, it does not ignite when the test is modified with either the Pyrox torch with #3 tip or the more severe Victor Type J-50 torch with #2 tip.

As with Example 1 above, this composition also has good lubricity over the wide range of loads from about 1 to 100 kilograms as shown by tests on the Shell 4-ball machine for the load range of from 1 to 40 kilograms and the Shell 4-ball extreme pressure machine over the load range of from about 70 to 100 kilograms. Typical results for this type composition are shown in the following tables.

Tests on the Shell 4-ball machine over the low load range of 1 to 40 kilograms made at 75° C. for a period of one hour at 600 revolutions per minute are shown in Table X below:

TABLE X

*Results of Lubricity Tests on Shell 4-Ball Machine*

[Steel-on-steel, 600 r.p.m., 75° C., 1 hour]

| Composition | Scar diameter in millimeters | | |
|---|---|---|---|
| | Applied load | | |
| | 1 kg. | 10 kgs. | 40 kgs. |
| 48 wt. percent tricresyl phosphate; 48 wt. percent Aroclor 1248; 4 wt. percent Acryloid HF-855 | .13 | .24 | .68 |

From Table X above it is evident that over the low load range of from 1 to 40 kilograms the composition has excellent lubricity and there is no impairment over Example 1 as shown in Table I above by the addition of poly alkyl methacrylate.

Tests on the Shell 4-ball extreme pressure machine over the high load range of about 70 to 100 kilograms made at the room temperature of about 75° F. for a period of time of 10 seconds at 1800 revolutions per minute are shown in Table XI below:

TABLE XI

*Results of Lubricity Tests on Shell 4-Ball Extreme Pressure Machine*

[Steel-on-steel, 1800 r.p.m., 10 seconds, room temp.]

| Composition | Scar diameter in millimeters |||||
|---|---|---|---|---|
| | Applied load ||||
| | 71 kgs. | 79 kgs. | 89 kgs. | 100 kgs. |
| 48 wt. percent tricresyl phosphate; 48 wt. percent Aroclor 1248; 4 wt. percent Acryloid HF-855 | 0.38 | 0.40 | 0.41 | 0.43 |

From Table XI it is evident that also over the high load range of about 70 to 100 kilograms this composition has excellent lubricity and there is no impairment over Example 1 as shown in Table II above by the addition of the poly alkyl methacrylate.

This aspect of the invention relating to the improvement of viscosity index without impairing other desirable properties is further illustrated by the additional examples set out in the following table:

TABLE XII

| | Fluid || Viscosity in cs. at— || Viscosity index |
|---|---|---|---|---|---|
| | Parts by weight | Components | 210° F. | 100° F. | |
| (1) | 43.1<br>53.6 | Tricresyl phosphate<br>Aroclor 1248 | 3.78 | 42.6 | −325 |
| (2) | 43.1<br>53.6<br>1.8 | Tricresyl phosphate<br>Aroclor 1248<br>Poly butyl methacrylate | 6.79 | 63.2 | +53 |
| (3) | 43.1<br>53.6<br>2.8 | Tricresyl phosphate<br>Aroclor 1248<br>Poly hexyl methacrylate | 7.32 | 68.3 | +65 |
| (4) | 43.1<br>53.6<br>1.8 | Tricresyl phosphate<br>Aroclor 1248<br>Poly octyl methacrylate | 5.94 | 60.3 | +4 |
| (5) | 43.1<br>53.6<br>3.3 | Tricresyl phosphate<br>Aroclor 1248<br>Poly octyl methacrylate | 8.03 | 70.6 | +86 |
| (6) | 43.6<br>53.7<br>1.5 | Tricresyl phosphate<br>Aroclor 1248<br>Poly($C_{16}$–$C_{18}$)-alkyl methacrylate | 5.88 | 57.7 | +11 |
| (7) | 43.6<br>53.7<br>3.3 | Tricresyl phosphate<br>Aroclor 1248<br>Poly($C_{16}$–$C_{18}$)-alkyl methacrylate | 8.95 | 77.4 | +97 |
| (8) | 50.0<br>50.0 | Tricresyl phosphate<br>Aroclor 1254 | 4.98 | 82.5 | −326 |
| (9) | 50.0<br>50.0<br>4.0 | Tricresyl phosphate<br>Aroclor 1254<br>Acryloid HF-855 | 7.66 | 95.0 | +13 |
| (10) | 50.0<br>50.0 | Tricresyl phosphate<br>Aroclor 1242 | 3.28 | 26.3 | −170 |
| (11) | 50.0<br>50.0<br>4.0 | Tricresyl phosphate<br>Aroclor 1242<br>Acryloid HF-855 | 5.25 | 38.1 | +63 |
| (12) | 46.0<br>54.0 | Cresyl diphenyl phosphate<br>Aroclor 1248 | 3.07 | 23.0 | −158 |
| (13) | 46.4<br>53.6<br>3.3 | Cresyl diphenyl phosphate<br>Aroclor 1248<br>Poly octyl methacrylate | 6.53 | 43.4 | +111 |

The poly alkyl methacrylate referred to in Table XII above are further identified as follows:

The poly butyl methacrylate —30% in dibutyl phenyl phosphate has a viscosity of 198 centistokes at 210° F.

The poly hexyl methacrylate —30% in tributyl phosphate has a viscosity of 252 centistokes at 100° F.

The poly octyl methacrylate —55% in 2-ethylhexyl diphenyl phosphate has a viscosity of 445 centistokes at 210° F.

The poly($C_{16}$–$C_{18}$)-alkyl methacrylate was made from a mixture of alcohols from $C_{16}$ to $C_{18}$ and with 30% of the polymer in toluene the viscosity at 100° F. is 150 SUS.

Tests on the Shell 4-ball extreme pressure machine on two of the fluids shown in Table XII above over the high load range of 70 to 100 kilograms made at room temperature of about 75° F. for a period of time of 10 seconds at 1800 revolutions per minute are shown in Table XIII below:

TABLE XIII

| Composition | Scar diameter in millimeters ||||
|---|---|---|---|---|
| | Applied load ||||
| | 71 kgs. | 79 kgs. | 89 kgs. | 100 kgs. |
| (4) 43.1 tricresyl phosphate; 53.6 Aroclor 1248; 1.8 poly octyl methacrylate | 0.38 | 0.40 | 0.41 | 0.43 |
| (6) 43.6 tricresyl phosphate; 53.7 Aroclor 1248; 1.5 poly ($C_{16}$–$C_{18}$)-alkyl methacrylate | 0.40 | 0.41 | 0.42 | 0.44 |

From Table XIII above it is evident that these compositions with the poly alkyl methacrylate have excellent lubricity as indicated in this test.

It is a still further discovery in accordance with the invention that instead of the triaryl phosphates described above, compositions can be made with certain alkyl diaryl phosphates. Although these alkyl diaryl phosphates are generally useful for the purposes of the invention, they differ from the triaryl phosphates, in general, in that the resulting compositions have lower viscosities at low temperatures but certain of the fire-resistant properties are slightly less than those for compositions obtained by using the triaryl phosphates, particularly the fire-resistance property of spray flammability.

These alkyl diaryl phosphates useful in accordance with this aspect of the invention are those in which the aryl radicals may have from 6 to 8 carbon atoms, that is may be phenyl, cresyl or xylyl, and in which the alkyl radical has from 4 to 12 carbon atoms. Examples of the alkyl diaryl phosphates include butyl diphenyl, amyl diphenyl, hexyl diphenyl, heptyl diphenyl, octyl diphenyl, 6-methyl heptyl diphenyl and 2-ethyl hexyl diphenyl phosphates.

Compositions of the invention made with such alkyl diaryl phosphates are illustrated in the following table:

*TABLE XIV*

| | Fluid || Viscosity in cs. at— || Viscosity index |
|---|---|---|---|---|---|
| | Parts by weight | Components | 210° F. | 100° F. | |
| (1) | 42.7<br>54.0 | Butyldiphenylphosphate<br>Aroclor 1248 | 2.35 | 12.3 | −61 |
| (2) | 42.7<br>54.0<br>3.3 | Butyl diphenyl phosphate<br>Aroclor 1248<br>Acryloid HF-855 | 3.70 | 17.8 | +103 |
| (3) | 41.3<br>55.3 | 2-ethyl hexyl diphenyl phosphate<br>Aroclor 1248 | 2.69 | 16.3 | −90 |
| (4) | 41.3<br>55.3<br>3.4 | 2-ethyl hexyl diphenyl phosphate<br>Aroclor 1248<br>Acryloid HF-855 | 4.43 | 25.9 | +89 |

The examples in Table XIV above illustrate the invention particularly with respect to the surprising increase in viscosity index obtained with the use of poly alkyl methacrylate where the phosphate component is alkyl diaryl phosphate. This result is obtained without impairment of the other desirable properties of the fluid.

Tests on the Shell 4-ball extreme pressure machine on the two three component fluids shown in Table XIII above over the high load range of 70 to 100 kilograms made at room temperature of about 75° F. for a period of time of 10 seconds at 1800 revolutions per minute are shown in Table XV below:

*Table XV*

| Composition | Scar diameter in millimeters |||| 
|---|---|---|---|---|
| | Applied load |||| 
| | 71 kgs. | 79 kgs. | 89 kgs. | 100 kgs. |
| (2) 42.7 butyl diphenyl phosphate; 54.0 Aroclor 1248; 3.3 Acryloid HF-855 | 0.39 | 0.41 | 0.42 | 0.45 |
| (4) 41.3 2-ethyl hexyl diphenyl phosphate; 55.3 Aroclor 1248; 3.4 Acryloid HF-855 | 0.39 | 0.40 | 0.41 | 0.43 |

From Table XV above it is evident that these compositions with the poly alkyl methacrylate have excellent lubricity as indicated in this test.

As pointed out above, both certain triaryl phosphates and alkyl diaryl phosphates may be used as the phosphate ester component. Thus, in accordance with this broad aspect of the invention the phosphate ester component may be those phosphate esters represented by the formula in which R and R′ are radicals selected from the group consisting of phenyl, cresyl and xylyl and R″ is a radical selected from the group consisting of phenyl, cresyl, xylyl and an alkyl radical having from 4 to 12 carbon atoms. Each of these triaryl and alkyl diaryl phosphates could be used, or substituted for the particular phosphate esters in the examples above, without substantially affecting the excellent results obtained.

This application is a continuation-in-part of my copending application Serial No. 221,739, filed April 18, 1951, and my prior application Serial No. 28,521, filed May 21, 1948.

I claim:
1. The fire-resistant hydraulic fluid and lubricant consisting essentially of a mixture of from 20 to 80 percent of triaryl phosphate in which the aryl radicals have from 6 to 8 carbon atoms and a total of 19 to 24 carbon atoms and from 80 to 20 percent chlorinated biphenyl having a combined chlorine content of from 40 to 55 percent, and from 0.2 to 10 percent of poly alkyl methacrylate in which the alkyl radical has from 2 to 18 carbon atoms and having a molecular weight range within the range of about 2,000 to 20,000 and an average molecular weight of about 3,000 to 15,000 compatible with said mixture and effective to increase the viscosity index and viscosity at 210° F. of said mixture.

2. The fire-resistant hydraulic fluid and lubricant as defined in claim 1 in which the alkyl radical of said poly alkyl methacrylate has from 6 to 12 carbon atoms.

3. The fire-resistant hydraulic fluid and lubricant consisting essentially of a mixture of from 20 to 80 percent of tricresyl phosphate and from 80 to 20 percent chlorinated biphenyl having a combined chlorine content of from 40 to 55 percent, and from 0.2 to 10 percent of poly alkyl methacrylate in which the alkyl radical has from 2 to 18 carbon atoms and having a molecular weight range within the range of about 2,000 to 20,000 and an average molecular weight of about 3,000 to 15,000 compatible with said mixture and effective to increase the viscosity index and viscosity at 210° F. of said mixture.

4. The fire-resistant hydraulic fluid and lubricant as defined in claim 3 in which the alkyl radical of said poly alkyl methacrylate has from 6 to 12 carbon atoms.

5. The fire-resistant hydraulic fluid and lubricant consisting essentially of a mixture of from 20 to 80 percent of diphenyl cresyl phosphate and from 80 to 20 percent chlorinated biphenyl having a combined chlorine content of from 40 to 55 percent, and from 0.2 to 10 percent of poly alkyl methacrylate in which the alkyl radical has from 2 to 18 carbon atoms and having a molecular weight range within the range of about 2,000 to 20,000 and an average molecular weight of about 3,000 to 15,000 compatible with said mixture and effective to increase the viscosity index and viscosity at 210° F. of said mixture.

6. The fire-resistant hydraulic fluid and lubricant consisting essentially of a mixture of from 20 to 80 percent of alkyl diaryl phosphate in which the aryl radicals have from 6 to 8 carbon atoms and the alkyl radical from 4 to 12 carbon atoms, and from 80 to 20 percent chlorinated biphenyl having a combined chlorine content of from 40 to 55 percent, and from 0.2 to 10 percent of poly alkyl methacrylate in which the alkyl radical has from 2 to 18 carbon atoms and having a molecular weight range within the range of about 2,000 to 20,000 and an average molecular weight of about 3,000 to 15,000 compatible with said mixture and effective to increase the viscosity index and viscosity at 210° F. of said mixture.

7. The fire-resistant hydraulic fluid and lubricant as defined in claim 6 in which the alkyl radical of said poly alkyl methacrylate has from 6 to 12 carbon atoms.

8. The fire-resistant hydraulic fluid and lubricant consisting essentially of a mixture of from 20 to 80 percent of octyl diphenyl phosphate, and from 80 to 20 percent chlorinated biphenyl having a combined chlorine content of from 40 to 55 percent, and from 0.2 to 10 percent of poly alkyl methacrylate in which the alkyl radical has from 2 to 18 carbon atoms and having a molecular weight range within the range of about 2,000 to 20,000 and an average molecular weight of about 3,000 to 15,000 compatible with said mixture and effective to increase the viscosity index and viscosity at 210° F. of said mixture.

9. The fire-resistant hydraulic fluid and lubricant consisting essentially of a mixture of from 20 to 80 percent of phosphate ester represented by the formula in which R and R′ are radicals selected from the group consisting of phenyl, cresyl and xylyl and R″ is a radical selected from the group consisting of phenyl, cresyl, xylyl and an alkyl radical having from 4 to 12 carbon atoms and from 80 to 20 percent chlorinated biphenyl having a combined chlorine content of from 40 to 55 percent, and from 0.2 to 10 percent of poly alkyl methacrylate in which the alkyl radical has from 2 to 18 carbon atoms and having a molecular weight range within the range of about 2,000 to 20,000 and an average molecular weight of about 3,000 to 15,000 compatible with said mixture and effective to increase the viscosity index and viscosity at 210° F. of said mixture.

10. The fire-resistant hydraulic fluid and lubricant as defined in claim 9 in which the alkyl radical of said poly alkyl methacrylate has from 6 to 12 carbon atoms.

References Cited in the file of this patent

UNITED STATES PATENTS

| | | |
|---|---|---|
| 2,237,336 | Caprio | Apr. 8, 1941 |
| 2,245,649 | Caprio | June 17, 1941 |
| 2,438,446 | Leland | Mar. 23, 1948 |
| 2,469,285 | White | May 3, 1949 |
| 2,504,121 | Gamrath | Apr. 18, 1950 |
| 2,509,620 | Watson et al. | May 30, 1950 |
| 2,528,347 | Denison et al. | Oct. 31, 1950 |
| 2,636,861 | Watson | Apr. 28, 1953 |
| 2,707,176 | Gamrath et al. | Apr. 26, 1955 |